April 25, 1939.  E. O. CAVETT ET AL  2,156,145
EDIBLE CONTAINER-MAKING MOLD
Filed Feb. 17, 1937
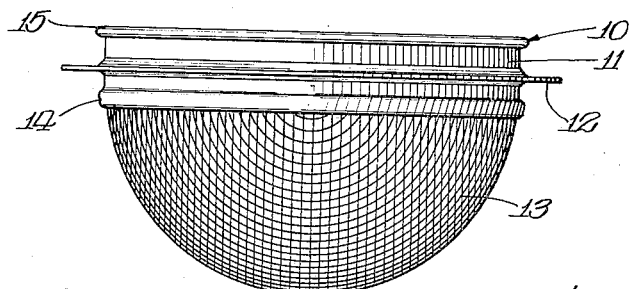
Fig.1.
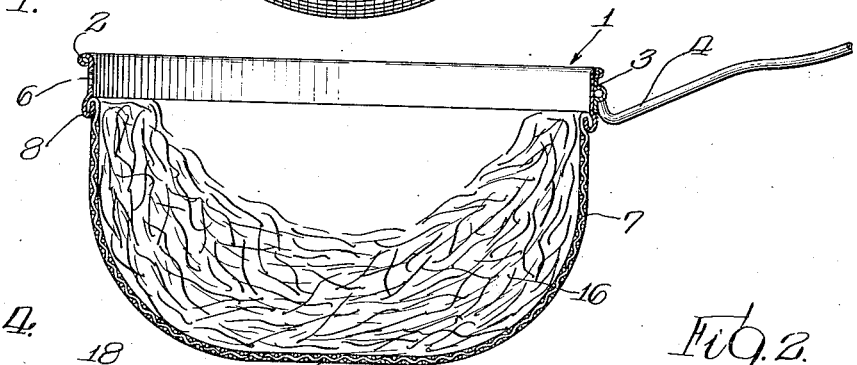
Fig.4.
Fig.2.
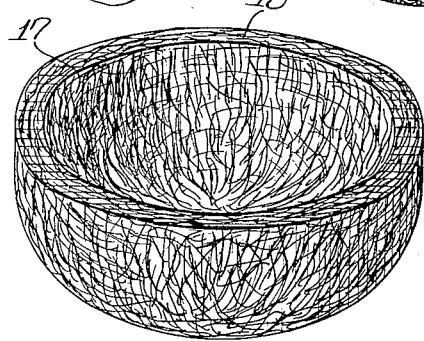
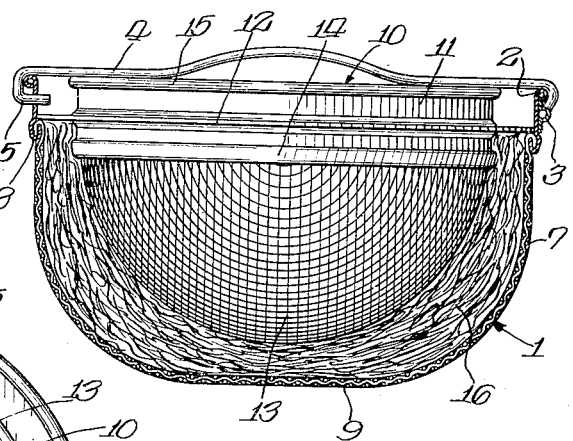
Fig.3.
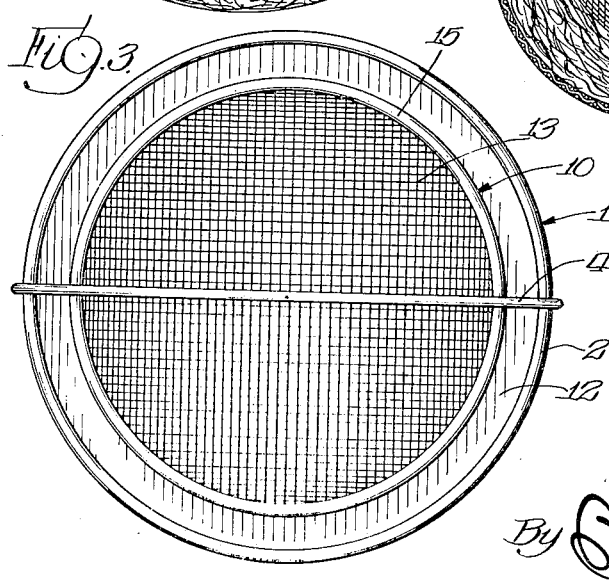
Inventors:—
Ernest O. Cavett,
Roy O. Cavett,
By S. F. Hall, atty.

Patented Apr. 25, 1939

2,156,145

UNITED STATES PATENT OFFICE 2,156,145

EDIBLE CONTAINER-MAKING MOLD

Ernest Oren Cavett and Roy O. Cavett, Milwaukee, Wis.

Application February 17, 1937, Serial No. 126,192

3 Claims. (Cl. 53—7)

This invention relates to improvements in molds, having for an object to provide a novel mold for producing edible containers of the cup or dish-like type which are used to receive and retain various foods for table serving.

The invention also aims to provide a mold of such construction that edible containers made thereby will be provided with uniform appearance and finish, to the extent that the food receiving compartment thereof will be evenly and comparatively smoothly surfaced throughout; the marginal edges of the same straight and regularly formed entirely thereabout, and the side walls formed to present a maximum of resistance against undesirable deterioration by reason of the contact of soft foods, dressings, gravies, or the like therewith.

It is also an object of the invention to provide a novel means for molding the container and for retaining it in a molded state during the periods of cooking of the same, after which the edible container will be form sustaining when removed from the molding means.

Other objects of the invention will be in part obvious, and in part pointed out hereinafter.

In order that the invention and its mode of operation may be readily understood by those skilled in the art to which it appertains, we have in the accompanying drawing and the detailed description based thereupon, set out one embodiment of our invention.

In the drawing:

Figure 1 is a disassembled view, partially in vertical section, illustrating the co-operating elements of the mold and the arrangement of edible matter therein from which the containers are formed, prior to its cooking;

Figure 2 is a vertical section through the improved mold, showing the co-operating elements thereof in operative or molding relationship;

Figure 3 is a top plan view of the mold, and,

Figure 4 is a detail in perspective of a finished or molded edible container produced by our improved mold.

Having more particular reference to the drawing, in connection with which like characters of reference will designate corresponding parts throughout, our improved edible container is formed or made through the usage of a reticulated mold comprehending a bowl-like receiving mold section generally designated by the numeral 1, consisting of an annular frame made of sheet metal or other suitable material reinforced about its upper marginal portion by the forming of a continuous bead 2 thereabout, while an over-bent tongue 3 is integrally formed upon one portion of said frame and is adapted to pivotally receive one end of a locking rod 4, the length of which is slightly greater than the diameter of said annular frame 1 and is adapted to have spanning engagement thereover; the remaining or normally free end of said rod being formed with a catch portion 5 adapted to be detachably engaged in an appropriate opening 6 provided therefor in that part of the frame 1 diametrically opposite the pivotal mounting of the rod 4. A basket or bowl-like reticulated body 7 is provided the normally inner margin of the frame 1. Said body 7 may be formed of wire screening of a suitable mesh, the marginal portions of which are securely connected to the adjacent portion of the frame 1 by an interlocking and rolled flange joint designated at 8. In this connection, it will be noted that the bottom of the reticulated basket 7 is flattened, as indicated at 9, whereby to permit of stable arrangement thereof upon a supporting surface and its retention in an upright position, as well as to form the bottom of the edible container molded therein with a similar flattened bottom portion for like purposes.

A second mold section, generally indicated by the numeral 10 is also comprehended by the improved device, comprising an annular frame 11, made of sheet metal or other suitable material, the outer face of which is provided with a right-angularly disposed or laterally extending flange 12 entirely thereabout. A reticulated substantially hemi-spherically shaped element 13 is secured to the normally inner or lower portion of the annular frame 11 by an interlocking and rolled flange joint 14. Also, the upper marginal portion of said frame 11 is preferably formed entirely thereabout with a rolled reinforcing bead or flange 15. In this connection, it will be noted that the mold section 10 is of less diameter than that of the section 1 and that it is adapted to be engaged or nestingly received within said section 1, as illustrated in the Figure 2 of the accompanying drawing. When so nestingly received within the section 1, it will be furthermore noted that the section 10, because of its lesser diameter, will provide molding space between its outer surface and the inner surface of the section 1; moreover, that because of the relatively different curvatures or shapes of the reticulated portions 7 and 13 of the sections 1 and 10, that the referred to space between such sections will be comparatively wider in proximity to the lower portions of the sides thereof than at the extreme tops and bottoms of such sections, the purpose of which will be hereinafter more fully described.

With nesting engagement of the mold section 10 in the mold section 1, attention is invited to the fact that the laterally disposed flange 12 carried on the annular frame 11 of the section 10 will snugly engage with the corresponding frame of the section 1, and that the outer marginal portion of said flange will be seated or engaged with that annular shoulder provided within said frame of the section 1 by reason of the interlocking and rolled flange joint 8, as is well illustrated in the Figure 2 of the accompanying drawing, hence, insuring the desired or proper spacing of the inner extremity of the mold section 10 with respect to the adjacent or bottom portion of the mold section 1.

In preparing edible containers by our invenvention, we may use various forms of shredded or similarly prepared foodstuffs, such for example, as shredded or finely cut raw potatoes or strips of potatoes. Following the proper preparation and treatment of these shredded potatoes, a quantity of the same is placed within the mold section 1 and is substantially evenly distributed or spread over the inner surface of the reticulated body 7. At this time, the mold section 10 is engaged in the aforesaid section 1 and is forced inwardly into that nesting arrangement or relationship as illustrated in the Figure 2, with the annular flange 12 of the frame 11 snugly engaging with the annular frame of the mold section 1 and resting or seating upon the aforesaid inwardly arranged annular shoulder constituted by the joint 8. When the mold section 10 is in the stated position, it will be understood that the shredded raw potatoes, now indicated for convenience by the numeral 16, will be slightly compressed between the reticulated portions 7 and 13 of the mold sections 1 and 10, and by consequence, that it will be molded or shaped to conform to that area or space heretofore described and occurring between the adjacent outer surface of the mold section 10 and the adjacent inner surface of the mold section 1; furthermore, that the inner surface of the laterally disposed flange 12 will engage with the upper portion of the thus molded raw shredded potato mass 16, insuring the formation of an even or uniform and right-angularly shaped edge or marginal portion therefor. At this time, the pivotally mounted rod 4 is swung diametrically over the nestingly engaged lower section 10, bearing upon adjacent or contacted portions of the flange 15 of the annular frame 11, whereupon the catch provided end 5 of said rod is engaged in its keeper opening heretofore described, thereby securely locking the mold sections 1 and 10 in proper molding relation, as above described.

The mold with the raw potato matter 16 therein is now dropped or immersed in grease or vegetable oil heated to a temperature sufficient to cook the same; the mold being permitted to remain within this cooking medium until the potato product has been effectually cooked. Following cooking of the potato product in the mold, the latter is removed from the grease or oil, above referred to, whereupon the catch portion 5 of the rod 4 is disengaged from the opening 6 and is swung to an open position. Thereupon, the inner or nestingly engaged mold section 10 is removed from the mold section 1, permitting of removal of the now cooked and edible container 17 from said section 1. At this point, it should be noted that the edible container 17 will be provided with an even and uniform right-angularly shaped marginal portion 18 entirely thereabout; also, that the lower portions of the side walls of said container will be of greater thickness than the upper and bottom portions thereof; furthermore, that the outer surface of the bottom of said container will be flattened to accord with the flattened formation 9 of the reticulated body 7 heretofore described, thus permitting the edible container to flushly engage with a receiving surface and to retain an upright position.

Edible containers such as above described, as will be understood by workers skilled in this art, may be utilized in various ways, i. e., for receiving various forms of prepared foods, salads, etc.

Manifestly, the construction shown is capable of further modification, and such modification as is within the scope of our claims, we consider within the spirit of our invention.

We claim:

1. A device of the character described, comprising a bowl-like mold section consisting of an annular frame and a perforate bowl-like body portion connected to and carried by said frame, the normal bottom portion of which is flattened and the connection between said perforate body portion and said annular frame providing an internal annular shoulder, and a second mold section consisting of an annular frame, the diameter of which is less than that of said first mold section, a circumferentially extending right-angularly disposed flange carried by said second annular frame adjacent its upper extremity, the outer marginal portion of which is adapted to be snugly engaged with the inner peripheral surface of said first annular frame upon engagement of the second annular frame therein, and a perforate substantially hemispherically shaped body portion connected to and carried by said second frame, said second frame and its perforate body portion being adapted to be nestingly engaged within the frame and perforate body portion of said first mold section and to be inwardly spaced with relation thereto by engagement of said right-angularly disposed flange within said first mentioned annular frame, and means for releasably securing said second mold section within said first mold section.

2. A device of the character described, comprising an annular frame, a perforate mold portion permanently secured at and about its upper extremity to the inner extremity of said frame, the walls of said frame and the side walls of the mold portion being disposed in substantial parallel relationship, an annular internal shoulder on said frame adjacent its inner extremity, a second annular frame of a diameter less than the first frame receivable therein in spaced relationship, the depth of said second frame being greater than that of said first frame, a right-angularly disposed flange carried upon the intermediate portion of the outer side of said second frame and engageable upon the internal shoulder of said first frame, the inner portion of said second frame extending below the inner extremity of said first frame and the outer extremity thereof being disposed in substantially the same plane in which the outer extremity of said second frame is arranged upon its reception within the latter, a perforate mold portion permanently secured to the inner extremity of said second frame and receivable within said first perforate mold portion in spaced relation thereto, and means for releasably securing said second frame and its perforate mold portion within said first frame and its perforate mold portion.

3. A device of the character described, comprising an annular frame, a perforate mold portion permanently secured at and about its upper extremity to the inner extremity of said frame, an annular internal shoulder on said frame adjacent its inner extremity, a second annular frame of diameter less than that of the first frame receivable therein in spaced relationship, the depth of said second frame being greater than that of said first frame, a laterally extending flange carried upon and extending about the intermediate portion of said second frame and engageable upon the internal shoulder of said first frame, the inner portion of said second frame extending below the inner extremity of said first frame and the outer extremity thereof being disposed in substantially the same plane in which the outer extremity of said second frame is arranged upon its reception within the latter, a perforate mold portion permanently secured at its upper extremity to the inner extremity of said second frame and receivable within the mold portion of said first frame in spaced relation thereto, a locking rod hingedly connected at one of its ends to a portion of said first frame and swingable thereover and over the upper extremity of said second frame, the length of said locking rod being greater than the diameter of said first frame, and means on the free end of said locking rod removably engageable with a portion of said first frame substantially diametrically opposite to its hinged mounting thereupon.

ERNEST OREN CAVETT.
ROY O. CAVETT.